L. STOCKSTROM.
METHOD OF FORMING PIPE TAPS.
APPLICATION FILED MAY 3, 1913.
1,146,664.
Patented July 13, 1915.
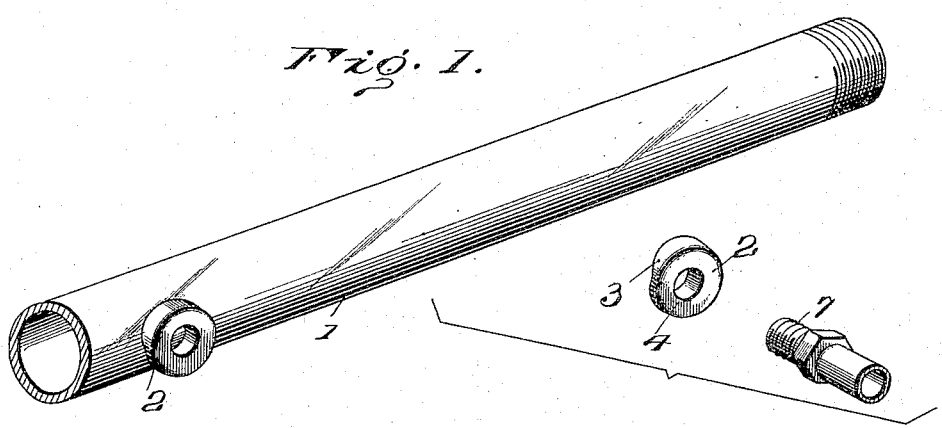
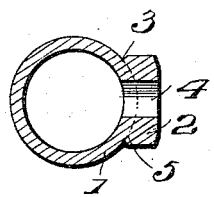
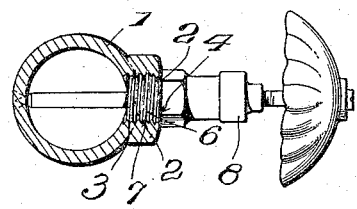
Witnesses
W. A. Williams
L. L. Burket
Inventor
Louis Stockstrom,
By A. S. Pattison,
Attorney

UNITED STATES PATENT OFFICE.

LOUIS STOCKSTROM, OF ST. LOUIS, MISSOURI, ASSIGNOR TO AMERICAN STOVE COMPANY, OF ST. LOUIS, MISSOURI, A CORPORATION OF NEW JERSEY.

METHOD OF FORMING PIPE-TAPS.

1,146,664.  Specification of Letters Patent.  Patented July 13, 1915.

Application filed May 3, 1913. Serial No. 765,319.

*To all whom it may concern:*

Be it known that I, LOUIS STOCKSTROM, a citizen of the United States, residing at St. Louis, in the State of Missouri, have invented certain new and useful Improvements in Methods of Forming Pipe-Taps, of which the following is a specification, reference being had therein to the accompanying drawing.

My invention relates to improvements in the method of forming pipe taps, the object of which is to enable a tight angular pipe connection to be made in an improved manner.

My improved method is especially intended for use in making taps in a gas pipe where a very tight joint is desired, as in the mains on a gas stove known in the trade as gas stove manifolds.

My improvement is especially adapted to be applied to a pipe which is used on the front of all gas ranges into which the cocks are screwed. There has been a great deal of trouble experienced with leaks on account of the poor threads in such pipes and to overcome this difficulty, my improvement is applicable with entire success.

It is difficult to make a manifold for a gas range which has a good place to attach a gas cock. Heretofore such attachment has been made by simply drilling holes into such a manifold and tapping them, but this only gives one or two full threads unless an extra heavy pipe is used, and also with the use of a lot of nipples and T's put in between, the branch of these T's to be used for the cocks. However, due to these numerous connections there has been great difficulty experienced with leaks. Another manner of tapping the manifold has heretofore been to cast it in one piece with projections for the cocks. This last mentioned way has had the great disadvantage that the manifold is very hard to polish after it is cast and in polishing such a cast manifold much expense has been incurred. By my improved manner of using a wrought iron manifold in attaching my improved construction of tap, the manifold can first be polished while it is straight and my tap applied afterward, the whole manifold and tap then simply buffed over and nickel plated and then is ready for use.

In the accompanying drawing—Figure 1 is a perspective view of a pipe showing a drop forged ring and section of pipe in separated relation and also a drop forged ring welded to the pipe. Fig. 2 is a sectional view of a pipe and ring attached thereto and also showing a hole drilled through the pipe to register with the opening in the ring. Fig. 3 is a sectional view of a ring applied to a manifold, a hole drilled through the pipe and registering with the hole in the ring and gas cock applied to said tapped hole.

Referring now to the drawing, 1 represents a wrought iron pipe to which a ring 2, is applied. The ring 2 has a concave surface 3, adapted to fit the convex surface of the pipe 1. The ring 2 has an opening 4, which is the desired size of the hole to be tapped within the pipe 1, and after the ring 2 has been welded to the pipe 1, as shown in Fig. 1, a hole 5 is drilled through the pipe, as shown in Fig. 2, registering with the hole 4 in the ring 2. This registering opening is then provided with a continuous internal screw thread 6, as shown in Fig. 3, which is adapted to receive an externally screw-threaded portion 7 of an ordinary gas cock 8.

My improved tap overcomes the difficulties of leaks; is also a great saving in the manufacture of wrought iron pipes when the pipe is intended to be polished and is a special saving when such tapped pipe is to convey gas, as is the case when used on a gas stove. By using a wrought iron pipe and attaching the rings either by electric welding, electric brazing or the usual welding methods, the advantage arises that the pipe can first be polished while it is straight, the rings welded or brazed on, the holes drilled and tapped and then the whole simply buffed over and nickel plated.

Having thus described my invention, what I claim and desire to secure by Letters Patent is:

The method of making a polished gas stove manifold consisting in providing a polished pipe and a separate polished boss having one side thereof concaved to fit the outer convex surface of the pipe, welding or brazing the convex and concave surfaces of the boss and pipe together, and thereafter providing the boss and pipe with registering screw-threads, whereby the pipe and boss may be separately polished before joining them, for the purpose described and whereby an elongated screw-threaded surface is provided for making a tight joint between the manifold and cock connection.

In testimony whereof I hereunto affix my signature in the presence of two witnesses.

LOUIS STOCKSTROM.

Witnesses:
O. H. GUETHER,
MAX LEPTIN.

Copies of this patent may be obtained for five cents each, by addressing the "Commissioner of Patents, Washington, D. C."